United States Patent [19]

Moehling

[11] Patent Number: 4,838,174
[45] Date of Patent: Jun. 13, 1989

[54] RAILWAY TRUCK BOLSTER WITH IMPROVED BRAKE ATTACHMENT

[75] Inventor: Charles Moehling, Arlington Heights, Ill.

[73] Assignee: AMSTED Industries Incorporated, Chicago, Ill.

[21] Appl. No.: 200,466

[22] Filed: May 31, 1988

[51] Int. Cl.$^4$ .............................................. B61F 1/08
[52] U.S. Cl. ................................................... 105/226
[58] Field of Search ............... 105/226, 227, 228, 229, 105/230

[56] References Cited

U.S. PATENT DOCUMENTS 4,729,325  3/1988  Henkel ................................. 105/226

Primary Examiner—Robert B. Reeves
Assistant Examiner—Gary C. Hoge
Attorney, Agent, or Firm—Edward J. Brosius; Charles E. Bouton

[57] ABSTRACT

The present invention provides a railway truck bolster with an improved brake attachment assembly. The top web section of the bolster has outer walls extending downwardly therefrom, which outer walls terminate in the lower section of the bolster. A centerplate is located on the top section of the bolster intermediate the ends thereof. Two bolt receiving openings are located to one side of the centerplate in one of the bolster walls. The bolt receiving openings are laterally spaced from each other and are located just below the top section of the bolster. A flange extends upwardly from the wall of the bolster and is located generally laterally between the two bolt receiving openings in the wall. The flange extends upwardly above the top section of the bolster and includes a bolt receiving opening. A recess extends longitudinally from the flange across at least a portion of the top section of the bolster. Furthermore, the underside of the top section of the bolster is reinforced below the recess.

12 Claims, 3 Drawing Sheets

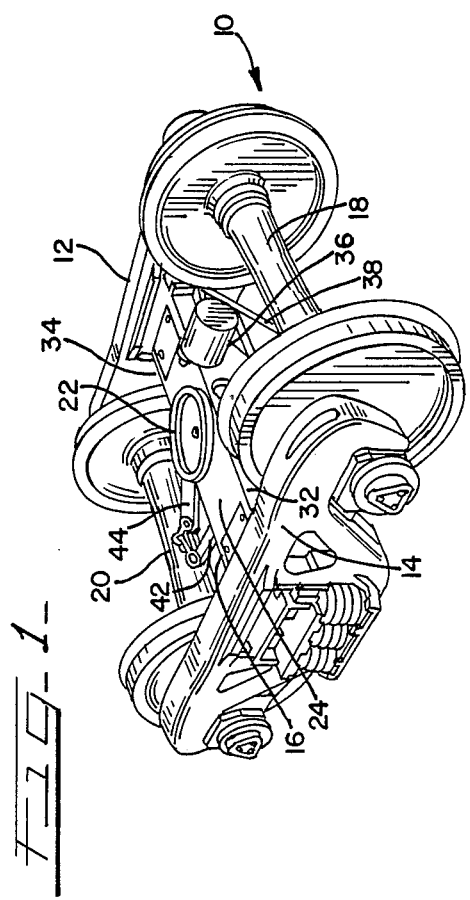
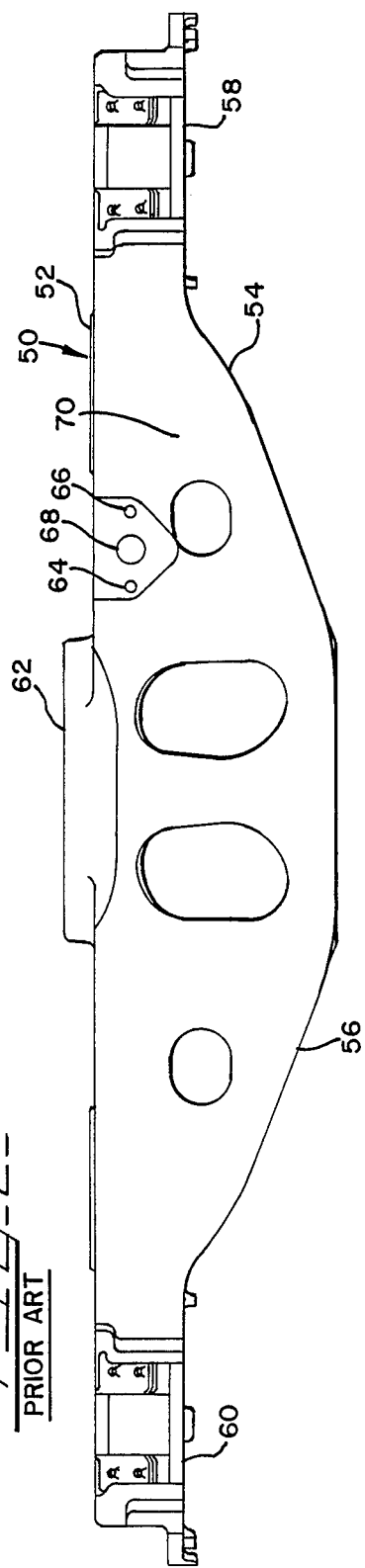

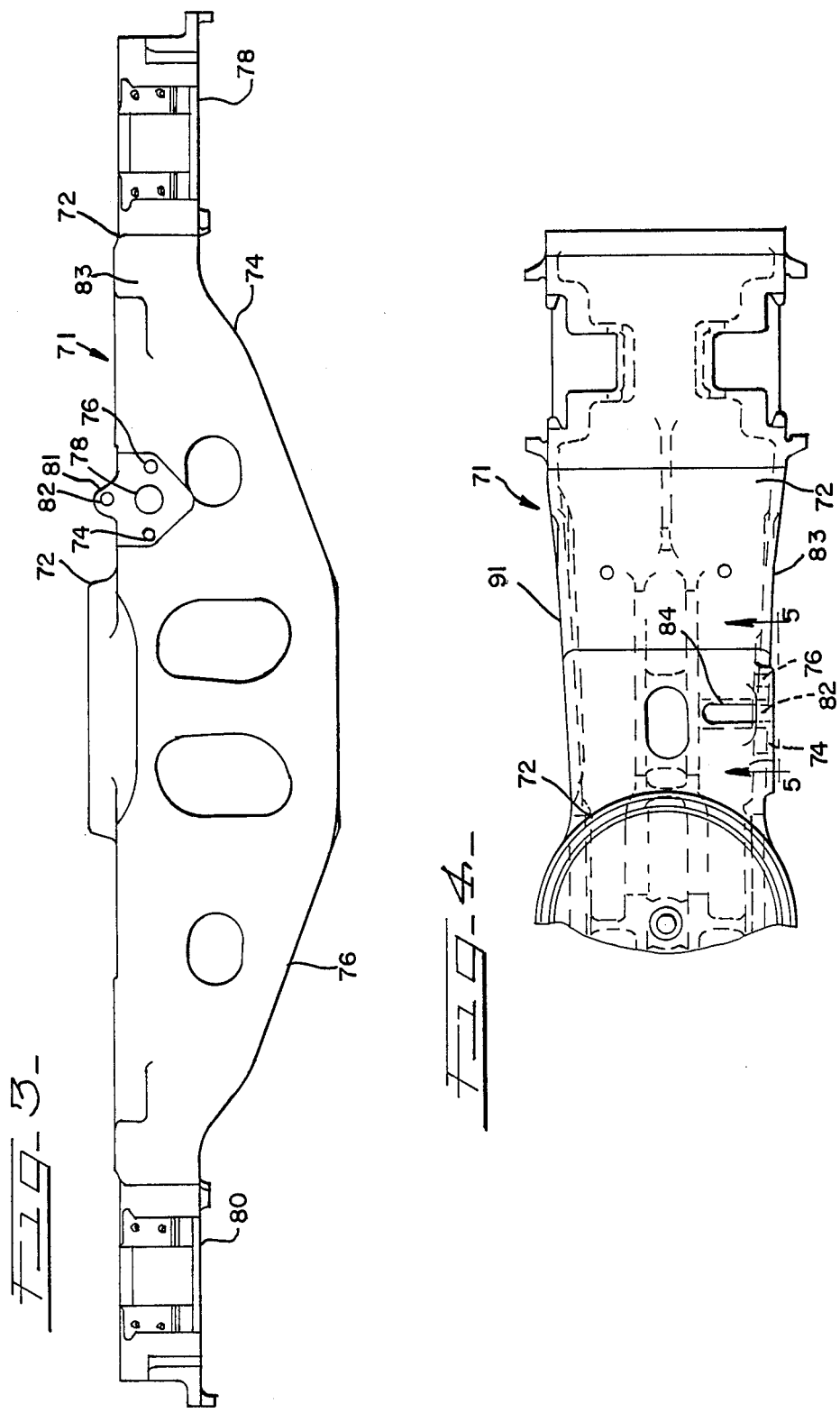

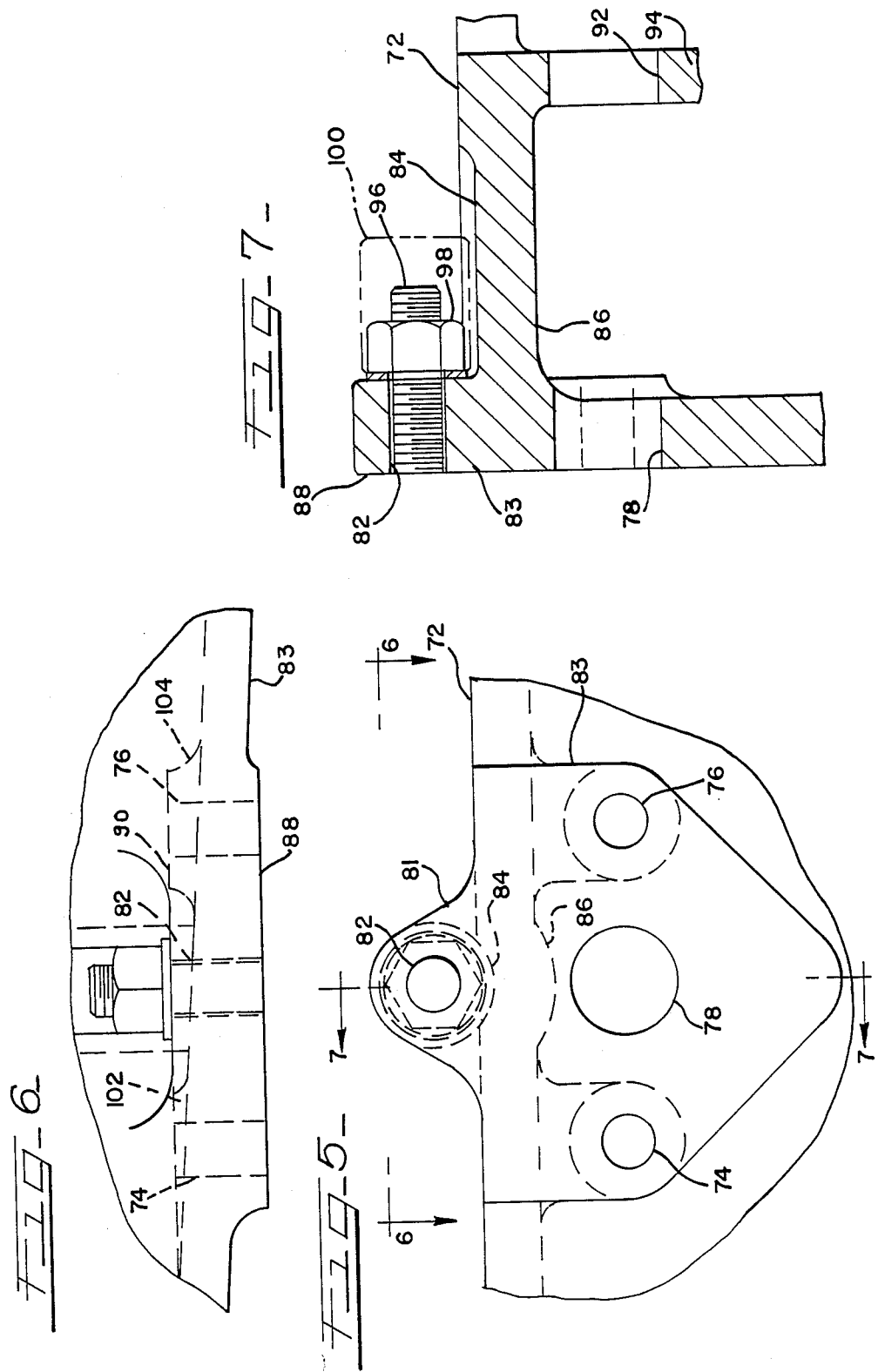

RAILWAY TRUCK BOLSTER WITH IMPROVED BRAKE ATTACHMENT

BACKGROUND OF THE INVENTION

The present invention relates to railway car trucks, and, more particularly, to railway car truck bolsters having an improved brake cylinder attachment arrangement.

Railway freight car trucks are usually comprised of the three piece arrangement wherein each truck comprises two sideframes laterally spaced from each other and receiving two axle-wheelsets. A bolster extends laterally between the sideframes having its ends received in an opening in each sideframe. The end of the bolster sits on spring arrangements and usually includes damping devices to limit oscillations. A centerplate is located laterally intermediate the ends of the bolster on the top section of the bolster. Such centerplate receives the corresponding centerplate of the freight car body bolster.

Brake beams with corresponding operating assemblies are affixed to the bolster in several known methods. One attachment arrangement for a brake assembly is shown in U.S. Pat. No. 4,729,325, assigned to the assignee of the present invention. In such a known arrangement, three bolt receiving openings are placed in a triangular arrangement in a sidewall of the bolster, with two of the bolt receiving openings located just below the top section of the bolster and the third bolt receiving opening located laterally between and below the two bolt receiving openings. The third bolt receiving opening accordingly also passes through a wall of the bolster. Other known brake receiving arrangements include two openings extending through a sidewall of the bolster. With increased tonnage being carried by modern railway freight cars, it is necessary to provide larger size brake assemblies including large brake cylinders. Such large brake cylinders cannot be properly affixed to a bolster using only two bolt receiving holes, and would interfere with the brake operating mechanism if located in the bolt receiving arrangement with all three bolt holes in the wall of the bolster below the top section of the bolster, for certain freight car applications.

Accordingly, it is an object of the present invention to provide an improved brake mounting assembly as an integral part of a railway truck bolster.

SUMMARY OF THE INVENTION

The present invention provides a railway feight car bolster with an improved brake mounting arrangement. The brake mounting arrangement comprises two bolt receiving openings in a sidewall of the bolster just below the top section of the bolster. These two bolt receiving openings are laterally spaced from each other, and are located about equidistant below the top section of the bolster. A raised flange extends above the top section of the bolster from the sidewall in which the two bolt receiving openings are located. The raised flange is laterally intermediate the two bolt receiving openings in the sidewall of the bolster and itself contains a bolt receiving opening.

To provide tool access to the bolt extending through the bolt receiving opening in the raised flange, it is necessary to include a depression in the top section of the bolster extending longitudinally from the raised flange. Such recess typically is concave in structure and extends for either a portion or the total longitudinal width of the bolster top section. To insure proper strength of the top section of the bolster, an extension or thickening of the top section of the bolster is provided beneath the recess. Such extended section of the top section would extend again either a portion of or the total longitudinal width of the top section of the bolster, the extent of the reinforcing section usually corresponding to the extent of the recess.

To assure a firm fit of the brake cylinder onto the bolster wall, it is usually desirable to have the front faces of all three bolt receiving openings planar to each other. Further, the rear face of the wall of the bolt receiving openings and of the raised flange behind its bolt receiving opening are also desired to be planar to assure the solid tightening of the necessary washers and nuts to the threaded bolt shanks extending therethrough.

BRIEF DESCRIPTION OF THE DRAWINGS

In the drawings,

FIG. 1 is a perspective view of a railway truck with a brake assembly mounted on the bolster thereof;

FIG. 2 is a front view in partial cross section of a prior art railway truck bolster;

FIG. 3 is a front view in partial cross section of a railway truck bolster in accordance with the present invention;

FIG. 4 is a top view of a portion of the railway truck bolster of the present invention;

FIG. 5 is a detailed frontal view along lines 5—5 of a portion of the railway truck bolster shown in FIG. 4;

FIG. 6 is a cross sectional top view along lines 6—6 of the portion of the railway truck bolster of the present invention shown in FIG. 5; and FIG. 7 is a cross sectional view along lines 7—7 of a portion of the railway truck bolster of the present invention shown in FIG. 5.

DESCRIPTION OF THE PREFERRED EMBODIMENT

Referring now to FIG. 1 of the drawings, a railway truck in accordance with the present invention is shown generally at 10. Railway truck 10 comprises sideframes 12 and 14 that are laterally spaced from each other and which receive axle wheelsets 18, 20 in pedestal openings at their ends. Bolster 16 extends laterally between sideframes 12 and 14 and is received in bolster openings intermediate the pedestal ends of both sideframes. Bolster 16 includes a top section 24 having a centerplate 22 extending upwardly therefrom at a location intermediate the ends of bolster 16.

Modern railway freight car trucks 10 are usually comprised of cast steel sideframes 12 and 14 and a cast steel bolster 16. The sideframes 12, 14 and bolster 16 are usually unitary cast structures, but such structures, in order to save weight, include voids and internal reinforcing walls.

A brake assembly is affixed to sides 32 and 34 of bolster 16. The brake assembly includes cylinder 36 mounted to wall 32 of bolster 16, brake beams 38 which include brake shoes that contact the wheels of wheelsets 18 and 20, and other operative equipment such as bolster lever 42 and truck lever 44. Upon activation of cylinder 36, brake beams 38 force their attached brake shoes into contact with the railway wheels thereby applying braking force to the wheels.

Upon actuation of cylinder 36, a push rod (not shown) acts on bolster lever 42 to thereby actuate the braking operation. The push rod extends from cylinder 36 through an opening in both of walls 32 and 34 of bolster 16.

Referring now to FIG. 2, a prior art bolster is shown generally at 50. Bolster 50 is generally comprised of a cast steel assembly and is of a generally elongated generally rectangular shape. Bolster 50 includes top section 52, bottom sloping sections 54 and 56 which extend downwardly and inwardly from end sections 58 and 60, respectively. A centerplate structure 62 is a generally circular structure extending above top bolster section 52 and is located intermediate of end sections 58 and 60. Top section 52 and bottom sloped sections 54 and 56 are joined by outer wall sections 70 and another outer wall section (not shown). Further reinforcing ribs and sections are located internally from outer wall section 70.

Bolt receiving openings 64 and 66 protrude through outer sidewall 70 of bolster 50. An opening 68 is laterally intermediate of bolt receiving openings 64 and 66 and is adapted to allow the brake push rod to pass through any intermediate supporting sections and outwardly from the other outer wall (not shown) of bolster 50. Bolt receiving openings 64 and 66 are below top section 52 by an equidistant amount and are laterally spaced from each other. For 70 and 100 ton railway freight car applications, the two bolt receiving openings 64 and 66 are adequate to receive the appropriate size brake cylinder (not shown) needed to operate a brake system adequate for such capacity freight cars. Such brake cylinder would be mounted to bolster 50 by two bolts passing through bolt receiving openings 64 and 66.

Referring now to FIG. 3 of the drawings, a bolster in accordance with the present invention is shown generally at 71. Bolster 71 is a generally elongated, generally rectangular structure usually comprised of a cast steel unitary construction. Bolster 71 includes a top section 72 terminating in end sections 78 and 80. Extending downwardly and inwardly from end sections 78 and 80 are sloped bottom sections 74 and 76, respectively. Outer wall section 83 and another outer wall section (not shown) join the outer edges of top wall 72 and sloped bottom walls 74 and 76. In addition, various structural supports and internal walls are located inwardly from outer wall 83. A raised, generally circular centerplate 72 extends upwardly from top section 72 intermediate end sections 78 and 80.

Bolt receiving openings 74 and 76 extend through outer bolster wall 83. Bolt receiving openings 74 and 76 are laterally spaced from each other, are located laterally outward from raised centerplate 72 and are about an equal distance below top section 72 of bolster 71. Push rod opening 78 is laterally between bolt receiving openings 74 and 76 and extends through bolster outer wall 83 and any intermediate support walls and out the other bolster outer wall 91 (shown in FIG. 4). A raised flange 81 extends upwardly from bolster outer wall 83 above top section 72 of bolster 71. A bolt receiving opening 82 is present in raised flange 81. Raised flange 81 is laterally generally between bolt receiving openings 74 and 76, and, accordingly, bolt receiving openings 74, 76 and 82 form a triangular arrangement.

For a more detailed view of bolt receiving openings 74 and 76 and flange 81 with bolt receiving opening 82, FIGS. 4-7 are now referred to. An indented recess 84 extends across a portion of bolster top section 72 longitudinally from flange 81 and bolt receiving opening 82 therein. As best seen in FIG. 5, recess 84 is of a circular section, but of course could comprise a stepped multifaceted cross section as well. Extending below recess 84 is reinforcing section 86 which acts to maintain the thickness, and accordingly, strength of top bolster section 72 below recess 84. As seen in FIG. 7, reinforcing section 86 would normally extend inwardly for at least the longitudinal extent of recess 84 and in many cases to the first reinforcing rib 94, internal from outer bolster wall 83. As shown in FIG. 7, a bolt 96 passing through bolt receiving opening 82 in flange 81 would be held in place by nut 98. Recess 84 enables a socket 100 (shown in phantom) to be affixed to nut 98 thereby enabling the tightening thereof.

As best seen in FIG. 6, the front face of bolt receiving openings 74, 76 and 82 are in planar alignment at the outer surface 88 of outer wall 83. This ensures the secure affixing of an appropriate brake operating cylinder to outer wall 83 by the extension of three bolts extending from the brake operating cylinder into bolt receiving openings 74, 76 and 82. As mentioned above, for traditional 70 and 100 ton freight car applications, a two bolt brake operating cylinder is adequate. However, in larger capacity cars such as 125 ton applications, or in other applications where a larger capacity brake system may be desired, the three bolt brake cylinder can be readily received to outer wall 83 of bolster 71. As best seen in FIG. 6, the inside termination of bolt receiving openings 74, 76 and 82 are also aligned in a planar arrangement 90. For bolt receiving openings 74 and 76, such desired alignment requires the buildup of sections 102 and 104 from the inner side of bolster outer wall 83.

What is claimed is:

1. A railway truck bolster comprising
a top, generally flat section having an elongated, generally flat configuration, a raised circular centerplate extending from the center structure of said top section,
a bottom section and two end sections, said bottom section having two sloped surfaces extending downwardly from said end sections,
two side sections joining said top and bottom sections,
two bolt receiving openings in one of said side sections spaced laterally from each other and located an equal distance below the top section, said bolt receiving openings being laterally spaced from said raised circular centerplate,
and a raised flange extending upwardly from said one side section, said raised flange having a bolt receiving opening therein, and said raised flange located laterally generally between said bolt receiving openings in said one side section.

2. The railway truck bolster of claim 1 wherein said top section includes a recess extending longitudinally from said raised flange.

3. The railway truck bolster of claim 2 wherein said top section includes a reinforced area on an underside of said top section below said recess.

4. The railway truck bolster of claim 1 wherein said bolt receiving openings in said one side section and in said raised flange have face surfaces in planar alignment with each other.

5. The railway truck bolster of claim 2 wherein said recess in said top section comprises a concave channel running longitudinally across at least a portion of said top section of said bolster.

6. The railway truck bolster of claim 3 wherein said reinforced area comprises a convex ridge running longitudinally across at least a portion of said underside of said top section below said recess.

7. A railway truck bolster of cast steel comprising
a top web section having ends and a centerplate substantially intermediate said ends,
walls depending from said top web section,
and a bottom section joined to said walls,
a brake cylinder mounting arrangement comprising two bolt receiving openings on one of said walls, said bolt receiving openings being laterally spaced from each other and located about equidistant below said top web section, and a flange extending above said top web section from said one wall, said flange being located approximately laterally between said bolt receiving openings in said one wall and having a bolt receiving opening therein.

8. The railway truck bolster of claim 7 wherein said top web section includes a recessed area laterally aligned with said flange.

9. The railway truck of claim 8 wherein said top web section includes a reinforced area on an underside thereof, said reinforced area laterally aligned with said flange.

10. The railway truck bolster of claim 7 wherein said bolt receiving openings in said one wall and in said flange have face surfaces in planar alignment with each other.

11. The railway truck bolster of claim 8 wherein said recessed area in said top web section comprises a concave channel running longitudinally across at least a portion of said top web section.

12. The railway truck bolster of claim 9 wherein said reinforced area comprises a convex ridge running longitudinally across at least a portion of said underside of said top web section below said recess.

* * * * *